(12) United States Patent
Katti et al.

(10) Patent No.: US 10,831,183 B2
(45) Date of Patent: Nov. 10, 2020

(54) TRANSFER OF PRODUCTION CONTROL IN PROXIMITY TO PRODUCTION SITE FOR ENABLING DECENTRALIZED MANUFACTURING

(71) Applicant: SAP SE, Walldorf (DE)

(72) Inventors: Badarinath Katti, Kaiserslautern (DE); Michael Schweitzer, Kaiserslautern (DE)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 15/944,314

(22) Filed: Apr. 3, 2018

(65) Prior Publication Data

US 2019/0101903 A1    Apr. 4, 2019

Related U.S. Application Data

(60) Provisional application No. 62/566,551, filed on Oct. 2, 2017.

(51) Int. Cl.
*G05B 19/418*    (2006.01)

(52) U.S. Cl.
CPC ............ *G05B 19/4188* (2013.01); *G05B 2219/31001* (2013.01); *G05B 2219/32328* (2013.01); *G05B 2219/34379* (2013.01)

(58) Field of Classification Search
None
See application file for complete search history.

(56) References Cited

U.S. PATENT DOCUMENTS

| | | | | |
|---|---|---|---|---|
| 4,827,423 A * | 5/1989 | Beasley | ............ | G01N 29/2493 700/100 |
| 7,856,279 B2 * | 12/2010 | Hood | ............ | G05B 19/0426 700/19 |
| 8,069,071 B2 * | 11/2011 | Kall | ............ | G06Q 10/06 705/7.12 |
| 8,301,746 B2 * | 10/2012 | Head | ............ | G06F 9/5077 709/223 |
| 8,745,634 B2 * | 6/2014 | Agarwal | ............ | G06Q 10/0633 718/106 |
| 10,139,811 B2 * | 11/2018 | Lawson | ............ | G05B 19/4185 |

(Continued)

OTHER PUBLICATIONS

Anderson et al., "Centralized versus decentralized control in manufacturing: lessons froA3:A24m social insects." Complexity and complex systems in inditstry,Sep. 20, 2000, 14 pages.

(Continued)

*Primary Examiner* — Mohammad Ali
*Assistant Examiner* — David Earl Ogg
(74) *Attorney, Agent, or Firm* — Fish & Richardson P.C.

(57) ABSTRACT

In a process of transfer of production control in proximity to production site for enabling decentralized manufacturing, production control data and routing data are retrieved from a centralized system. The retrieved production control data and the routing data are stored within a connector installed at a proximity to a plant floor. An operation associated with the production control data of a purchase order is matched with the resource published in the connector. Upon determining the match between the operation and the resource, the resource is dynamically allocated to perform the operation. The control of manufacturing process of the plant floor is provided to the connector to realize de-centralized manufacturing.

14 Claims, 9 Drawing Sheets

(56) References Cited

U.S. PATENT DOCUMENTS

| | | | | |
|---|---|---|---|---|
| 2004/0010334 | A1* | 1/2004 | Bickley | G05B 19/4183 700/99 |
| 2006/0235554 | A1* | 10/2006 | Ellis | G06Q 10/10 700/96 |
| 2017/0357250 | A1* | 12/2017 | Sandler | G05B 19/41835 |

OTHER PUBLICATIONS

Hubanks, "Self-organizing military logistics." Embracing Complexity, Cambridge, Mass., 1998, 9 pages.

Bernard et al., "Virtualization For Dummies" Indianapolis, Indian: Wiley Publishing Inc, 2008, 50 pages.

Cérin et al., "Downtime statistics of current cloud solutions." International Working Group on Cloud Computing Resiliency, Tech. Rep, Mar. 2014, 5 pages.

Colombo, Armando W., Ronald Schoop, and Ralf Neubert. "An agent-based intelligent control platform for industrial holonic manufacturing systems." IEEE Transactions on Industrial Electronics 53.1 Feb. 6, 2006, 16 pages.

DocWiki.Cisco.com[Online], "Unified CCMP 8.5(x) Introduction," available on or before Feb. 21, 2013, via Internet Archive: Wayback Machine Url <http://web.archive.org/web/20130221064856/hhttps://docwiki.cisco.com/wiki/Introduction>, [retrieved on Nov. 5, 2019], retrieved from: URL <https://docwiki.cisco.com/wiki/Introduction>, 2 pages.

Fei, et al. "CCIoT-CMfg: cloud computing and internet of things-based cloud manufacturing service system." IEEE Transactions on Industrial Informatics 10.2, Feb. 17, 2014, 8 pages.

Georgakopoulos et al., "Internet of Things and edge cloud computing roadmap for manufacturing." IEEE Cloud Computing 4, Jul. 1, 2016, 8 pages.

Haupert, "DOMeMan: Repräsentation, Verwaltung und Nutzung von digitalen Objektgedächtnissen" Saarland University,Jan. 16, 2013, 261 pages.

Helo et al., "Toward a cloud-based manufacturing execution system for distributed manufacturing." Computers in Industry 65.4, May 1, 2014, 11 pages.

Hwang et al., "A business model for cloud computing based on a separate encryption and decryption service." 2011 International Conference on Information Science and Applications. IEEE, Apr. 26, 2011, 7 pages.

International Electrotechnical Commission, "Enterprise-control system integration—Part 3: Activity models of manufacturing operations management." IEC: Geneva, Switzerland, Dec. 2016, 176 pages.

Kurose, Jim, and Keith Ross. "Computer networks and the internet." Computer Networking: A Top-Down Approach Featuring the Internet (Pearson Education, 2009, (2013), 8 pages.

Leitão et al., "Agent-based distributed manufacturing control: A state-of-the-art survey." Engineering Applications of Artificial Intelligence 22.7, Oct. 1, 2009, 13 pages.

Lenart, Anna. "ERP in the Cloud-Benefits and Challenges," EuroSymposium on systems analysis and design. Springer, Berlin, Heidelberg, 2011, 13 pages.

Lim et al., "A multi-agent based manufacturing control strategy for responsive manufacturing." Journal of Materials Processing Technology 139.1-3, Aug. 20, 2003, 6 pages.

Lödding et al., "Decentralized WIP-oriented manufacturing control (DEWIP)." Production Planning & Control 14.1, Jan. 1, 2003, 13 pages.

Loeser et al., "Low-latency hard real-time communication over switched Ethernet." Proceedings. 16th Euromicro Conference on Real-Time Systems, 2004. ECRTS 2004 . . . IEEE, Jul. 2, 2014, 132 pages.

Luan et al., "Fog computing: Focusing on mobile users at the edge." arXiv preprint arXiv:1502.01815, Mar. 30, 2016, 11 pages.

Marques et al. "Decentralized decision support for intelligent manufacturing in Industry 4.0." Journal of Ambient Intelligence and Smart Environments 9.3, Jan. 1, 2017, 3 pages.

Marques et al., "An architecture to support responsive production in manufacturing companies." 2016 IEEE 8th International Conference on Intelligent Systems (IS). IEEE, Sep. 4-6, 2016, 7 pages.

Marston et al., "Cloud computing—The business perspective." Decision support systems 51.1, Apr. 1, 2011,11 pages.

Montreuil et al., "A strategic framework for networked manufacturing." Computers in industry 42.2-3, Jun. 1, 2000, 19 pages.

Mourtzis et al., "Decentralized manufacturing systems review: challenges and outlook." Robust Manufacturing Control, Springer, Berlin, Heidelberg, 2013, 10 pages.

Ramaswamy et al., "Characterizing network processing delay." IEEE Global Telecommunications Conference, 2004. GLOBECOM'04 . . . vol. 3. IEEE, Nov. 2004, 6 pages.

Saharidis et al., "Centralized versus decentralized production planning." RAIRO—Operations Research 40.2, Apr. 2006, 16 pages.

SAP.com[Online], "SAP Plant Connectivity," Sep. 25, 2017, [Retrieved on Nov. 26, 2019], retrieved from : URL <https://www.sap.com/products/manufactuting-automation-plant-connectivity.html>, 9 pages.

Siemens.com[Online], "Manufacturing Operations Management Software," available on or before Aug. 2, 2017, via Internet Archive: Wayback Machine URL <http://web.archive.org/web/20170802055135/http://www.plm.automation.siemens.com/mom/>, [retrieved on Nov. 5, 2019], retrieved from: URL <http://www.plm.automation.siemens.com/mom/>, 2 pages.

Tao et al., "Cloud manufacturing: a computing and service-oriented manufacturing model." Proceedings of the Institution of Mechanical Engineers, Part B: Journal of Engineering Manufacture 225.10, 2011, 8 pages.

Tao et al., "Manufacturing service management in cloud manufacturing: overview and future research directions." Journal of Manufacturing Science and Engineering 137.4, Apr. 2015, 12 pages.

Tcpipguide.com[Online], "Data Link Layer (Layer 2)," available on or before Sep. 12, 2017, via Internet Archive: Wayback Machine URL <http://web.archive.org/web/20170912020921/http://tcpipguide.com/com>, [retrieved on Nov. 5, 2019], retrieved from: URL <http://tcpipguide.com/>, 2 pages.

Ueda et al., "A concept for bionic manufacturing systems based on DNA-type information." Human Aspects in Computer Integrated Manufacturing. Elsevier, Jan. 1, 1992, 11 pages.

Ueda et al.,"Emergent synthesis approaches to control and planning in make to order manufacturing environments." CIRP Annals 53.1, Jan. 1, 2004, 4 pages.

Voorsluys et al., "Introduction to cloud computing." Cloud computing, Feb. 28, 2011, 41 pages.

Wang, "Machine availability monitoring and machining process planning towards Cloud manufacturing." CIRP Journal of Manufacturing Science and Technology 6.4, Jan. 1, 2013, 11 pages.

Warnecke, "Fractal Company—A Revolution in Corporate Culture" Manufacturing Technologies for Machines of the Future. Springer, Berlin, Heidelberg, 2003, 24 pages.

Wood et al., "The Case for Enterprise-Ready Virtual Private Clouds." HotCloud, Jun. 15, 2009, 5 pages.

Wu et al., "Cloud manufacturing: Strategic vision and state-of-the-art." Journal of Manufacturing Systems 32.4, Oct. 1, 2013, 16 pages.

www.soapui.org[Online], "SOAP UI Tool," Sep. 25, 2017, [Retrieved on Nov. 5, 2019], retrieved from : URL <https://www.soapui.org/>, 6 pages.

Xu, "From cloud computing to cloud manufacturing." Robotics and computer-integrated manufacturing 28.1, 2012, 12 pages.

Zhang et al., "Flexible management of resource service composition in cloud manufacturing." 2010 IEEE International Conference on Industrial Engineering and Engineering Management. IEEE, Dec. 7, 2010, 5 pages.

Zhong et al., "RFID-enabled real-time manufacturing execution system for mass-customization production." Robotics and Computer-Integrated Manufacturing 29.2, 2013, 10 pages.

* cited by examiner

| MANUFACTURING EXECUTION - SIMULATION | | | | | | |
|---|---|---|---|---|---|---|
| MATERIAL MAINTENANCE | BOM MAINTENANCE 202 | | | | | |
| BOM MAINTENANCE | ADD BOM DETAILS | | | | | |
| ROUTING MAINTENANCE | NAME BOM 1 | | | | | |
| | DESCRIPTION BOM 1 DESCRIPTION | | | | | |
| | STATUS RELEASABLE | | | | | |
| | EDIT \| BACK TO BOM LIST \|⊕NEW BOM ROW | | | | | |
| | SEQUENCE | BOM | COMPONENT | OPERATION | ASSEMBLY QUALITY | ACTIONS |
| | 1<br>206 | BOM 1<br>204 | MATERIAL 1<br>208 | OPERATION 1<br>210 | 1<br>212 | ✎ 📋 ✗ |
| | 2 | BOM 1 | MATERIAL 2 | OPERATION 2 | 1 | ✎ 📋 ✗ |
| | 3 | BOM 1 | MATERIAL 3 | OPERATION 3 | 1 | ✎ 📋 ✗ |
| | 4 | BOM 1 | MATERIAL 4 | OPERATION 4 | 1 | ✎ 📋 ✗ |
| | 5 | BOM 1 | MATERIAL 5 | OPERATION 5 | 1 | ✎ 📋 ✗ |

| MANUFACTURING EXECUTION - SIMULATION | | | | | | | |
|---|---|---|---|---|---|---|---|
| MATERIAL MAINTENANCE | ROUTING MAINTENANCE 214 | | | | | | |
| BOM MAINTENANCE | ADD ROUTING DETAILS | | | | | | |
| ROUTING MAINTENANCE | NAME ROUTING 1 | | | | | | |
| | DESCRIPTION ROUTING 1 DESCRIPTION | | | | | | |
| | STATUS NEW | | | | | | |
| | TYPE PRODUCTION ROUTING | | | | | | |
| | EDIT \| BACK TO BOM LIST \| ⊕ NEW BOM ROW | | | | | | |
| | SEQUENCE | ROUTING | CONDITION | OPERATION | NEXT OPERATION | NC OPERATION | ACTIONS |
| | 1 216 | ROUTING 1 218 | 1 220 | OPERATION 1 222 | OPERATION 2 224 | OPERATION 3 226 | |
| | 2 | ROUTING 1 | 1 | OPERATION 2 | OPERATION 3 | OPERATION 3 | |
| | 3 | ROUTING 1 | 1 | OPERATION 3 | OPERATION 4 | OPERATION 4 | |
| | 4 | ROUTING 1 | 1 | OPERATION 4 | OPERATION 5 | OPERATION 5 | |
| | 5 | ROUTING 1 | 1 | OPERATION 5 | OPERATION 5 | OPERATION 5 | |

| TABLE I 502 | | |
|---|---|---|
| NUMBER OF OPERATIONS IN PO | 5<br>506 | 3<br>514 |
| CLIENT – SERVER ENTITIES | RESOURCE - CMES | RESOURCE - CMES |
| NETWORK LATENCY PER CALL | 400 MS<br>508 | 400 MS<br>516 |
| CLIENT – SERVER CALLS | 10<br>510 | 6<br>518 |
| TOTAL NETWORK LATENCY SUFFERED BY PO | 4000 MS<br>512 | 2400 MS<br>520 |

| TABLE II 504 | | | | |
|---|---|---|---|---|
| NUMBER OF OPERATIONS IN PO | 5<br>522 | | 3<br>538 | |
| CLIENT – SERVER ENTITIES | GESCO - CMES | GESCO - RESOURCE | GESCO - CMES | GESCO - RESOURCE |
| NETWORK LATENCY PER CALL | 400 MS<br>530 | 30 MS<br>524 | 400 MS<br>546 | 30 MS<br>540 |
| CLIENT – SERVER CALLS | 2<br>532 | 10<br>526 | 2<br>548 | 6<br>542 |
| TOTAL NETWORK LATENCY | 800 MS<br>534 | 300 MS<br>528 | 800 MS<br>550 | 180 MS<br>544 |
| TOTAL NETWORK LATENCY SUFFERED BY PO | 1100 MS<br>536 | | 980 MS<br>552 | |

FIG. 5B

TRANSFER OF PRODUCTION CONTROL IN PROXIMITY TO PRODUCTION SITE FOR ENABLING DECENTRALIZED MANUFACTURING

This application claims the benefit of and priority to U.S. Provisional Patent Application No. 62/566,551, filed 2, Oct. 2017, titled "TRANSFER OF PRODUCTION CONTROL IN PROXIMITY OF PRODUCTION SITE TO ENABLE DECENTRALIZED MANUFACTURING".

BACKGROUND

Centralized manufacturing refers to a single manufacturing facility to produce and distribute the products or a single manufacturing facility to produce with multiple distribution points. In the centralized manufacturing, a centralized system (central entity) manages the entire system planning, e.g., operations at individual stages in manufacturing. Manufacturing execution system (MES) is one such centralized manufacturing control system which manages and coordinates functionalities of centralized manufacturing. The MES may be operated as a cloud-based solution. However, the centralized system (e.g., the MES) is often, complex having voluminous data which increases the processing time. Further, the centralized system is typically inflexible and does not provide a user with an option to make selection of resources, modify functions performed by resources, etc. Moreover, when the centralized control or the MES is deployed as a cloud-based solution there may be connectivity and network latency issues which adversely affects various operations (e.g., delays in retrieving data) in manufacturing processes.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 2A is a user interface illustrating a manufacturing execution system (MES), according to one embodiment.

FIG. 2B is a user interface illustrating a manufacturing execution system (MES), according to one embodiment.

FIG. 5B is a set of tables illustrating result of simulation with respect to network latency, according to one embodiment.

DETAILED DESCRIPTION

Figure 1:
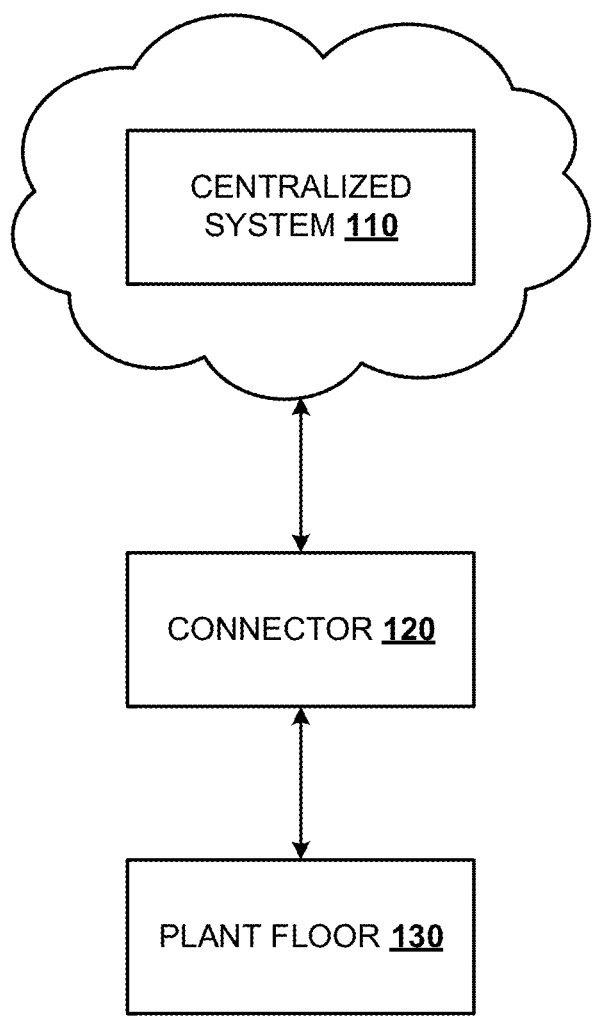
FIG. 1 is a block diagram illustrating high level architecture to enable decentralized manufacturing at a plant floor, according to one embodiment.

Embodiments of techniques of transfer of production control in proximity to production site for enabling decentralized manufacturing are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Manufacturing execution (ME) is a powerful, enterprise-level, scalable, manufacturing business solution that enables global manufacturers to manage and control manufacturing and shop floor operations. Shop floor refers to an area in a manufacturing facility where assembly or production is carried out, either by an automated system or by workers or a combination of both. The shop floor may include equipment, inventory and storage area. The shop floor may also be referred as plant floor, factory floor or production site. It provides a multi-faceted set of features that integrates business systems to the shop floor, allowing for complete component and material-level visibility for single and global installations. ME ensures that product is designed and built right the first time, collecting data from multiple sources and integrating data systems with shop floor activities to create one comprehensive production record. Genealogy is the tracking of a product's assembly through the manufacturing process such as tracking information about components, verifying that all the required components are assembled from start to end, availability of components, etc. A shop floor master data is defined and mapped with infrastructure in ME, and it includes details on what is manufactured in the shop floor. Routing is made up of a series of operations called routing steps and it represents how work is processed on the floor. These steps explain how manufacturing of a product takes place in the shop floor.

Manufacturing execution system (MES) refers to an automation software or a control system for managing and monitoring work-in-process in manufacturing or production systems such as on the shop floor. For example, the MES may coordinate functionalities of manufacturing or production systems. The MES keeps track of all manufacturing information in real time, receiving up-to-minute data from robots, machine monitors, and employees. The MES also documents the transformation of raw materials to finished goods. The MES works in real time to enable analyse and control multiple elements of production process (e.g. inputs, personnel, machines and support services). The MES provides information that helps manufacturing decision makers understand and analyse current conditions on the shop floor to optimize and improve production output. The MES may also be referred as manufacturing operations management (MOM) or collaborative production management (CPM).

FIG. 1 is a block diagram illustrating high level architecture to enable decentralized manufacturing at a plant floor, according to an embodiment. Connector 120 is connected to centralized system 110 to retrieve data from centralized system 110 and to enable decentralized manufacturing at plant floor 130. The connector 120 may be referred to as a service provider to the centralized system 110 (e.g., cloud-based manufacturing execution system (CMES)). The connector may be realized as a plug-in. In various embodiments, the connector 120 may be referred as a generic shop floor connector or GSFC. The centralized system 110 may be the CMES which includes data to monitor and control centralized manufacturing, e.g., at the plant floor 130. The data may be production control data (e.g., which controls production of a product such as data indicating quantity of product to be manufactured, etc.) and/or routing data (e.g., which includes routing details of individual operations required to produce the product, etc.). The connector 120 may retrieve/receive the data from the centralized system 110. The retrieved/received data is stored at the connector 120. The connector 120 is installed at a proximity to the plant floor 130 (e.g., very near or close to the plant floor 130). As the data is stored within the connector 120, the connector 120 takes charge of the production control from the centralized system 110 or CMES, which decentralizes the production or manufacturing process.

Further, as the connector 120 is in proximity to the production site e.g. plant floor 130, effectively the geographical distance between the centralized system 110 or CMES and the production site is reduced. Due to the reduced geographical distance, the connectivity and/or network latency issues are reduced/minimized which makes production process more efficient at the plant floor 130. In an embodiment, the connector 120 may be installed at the plant floor 130. The connector 120 including production control and routing data may monitor and control the manufacturing at the plant floor 130. Since the geographical distance between the connector 120 and the plant floor 130 is reduced, the network latency gets reduced and the data may be more efficiently and quickly downloaded from the connector 120 and used. In an embodiment, during the production execution, cloud based centralized system 110 or CMES transfers the data (e.g., production order, the product variant to be produced and the necessary routing details) to the connector 120 or GSFC. The production order (PO) defines which material is to be processed, at which location, and at what time and how much quantity is required. The transferred data helps the connector 120 or GSFC to take charge of the production control process. The connector 120 or GSFC links the virtual resource to real/physical resource at the production site (plant floor 130) and initiates the PO. Data from the centralized system 110 may be filtered and useful data may be transferred or stored within the connector 120. Since the filtered and useful data is stored in the connector 120, the data retrieval at the plant floor 130 from the connector 120 is quick making the production or manufacturing process more efficient. Moreover, manufacturers already using the centralized system 110 (e.g., the cloud based MES) may not be required to change or switch to new decentralized system with a tangential implementation, and instead implement the connector 120 for seamless implementation of the decentralized system.

FIG. 2A is a user interface illustrating a manufacturing execution system, according to an embodiment. MES application enables manufacturers to manage and control manufacturing and shop floor operations. MES application provides user with real-time visibility, real time manufacturing data to make quick and informed decisions, track and manage products, etc. To manufacture a product in the shop floor, materials are required. The material is a unique manufactured or purchased part that is processed or consumed on the shop floor. A machine or other piece of equipment used to perform an operation is a resource, for example, a drill, component feeder, etc. An operation is a unique task consisting of one or more work elements that involve users, machines, or processes that are done in one location, for example, paint, dry, assemble, test, etc. Bill of materials (BOM) is a structured list of the components and their quantities that make up an assembly. BOM maintenance 202 shows 'BOM 1' 204 in 'sequence 1' 206 with the component 'material 1' 208, 'operation 1' 210 and assembly quantity '1' 212. The 'BOM 1' 204 is a structured list of the components such as 'material 1' 208 and their quantity '1' 212 that make up the assembly.

FIG. 2B is a user interface illustrating a manufacturing execution system (MES), according to an embodiment. The order type selection supports the assignment of a routing and a BOM for each type of order that may be produced on a shop floor. Routing is a representation of how work is processed on the shop floor. Typically, routing is made up of a series of operations called as routing steps. Routing maintenance 214 is shown with routing information 'sequence 1' 216, 'routing 1' 218, 'condition 1' 220, 'operation 1' 222, next operation e.g. 'operation 2' 224 and the next operation after that is 'operation 3' 226. During the production execution, the shop-floor constantly seeks information from the MES. The work stations at the shop-floor request the MES for routing details at every stage of the production. Each work station collects the operation, bill of materials (BOM), machine parameters and other resource configuration details. Once this information is collected the machine is instructed on how to proceed with that step of the production process. Once that step of the production is completed, the work station informs MES the same along with the generated results. The MES then processes the results and accordingly sets the next operation of the production. This process continues until all the planned operations are executed to manufacture the planned component. During exceptional cases or conflicting goals, if the need arises, the routing path is changed, as instructed by MES, to accommodate the exceptional situation.

Figure 3:
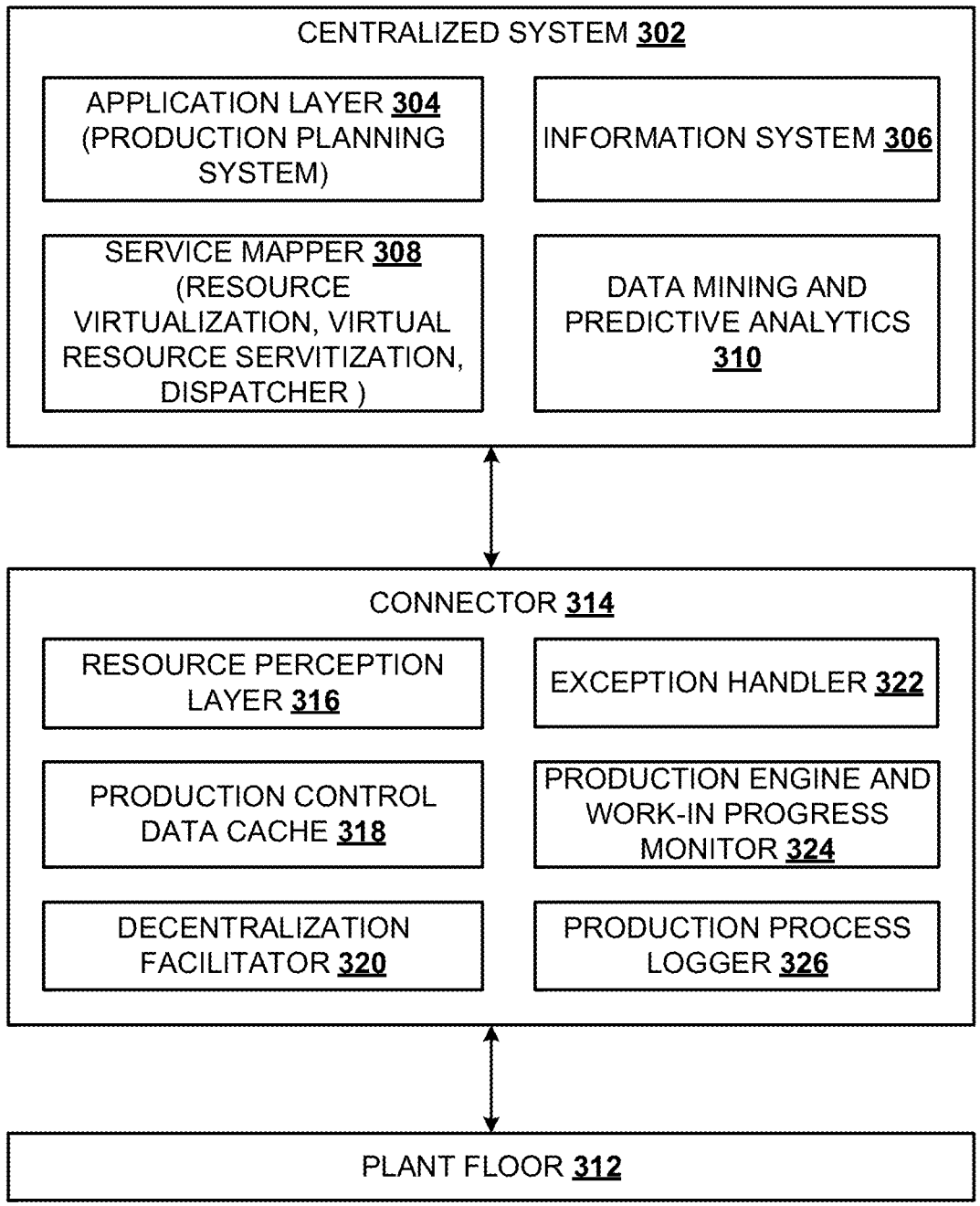
FIG. 3 is a block diagram illustrating architecture for transfer of production control in proximity to production site for enabling decentralized manufacturing, according to one embodiment.

FIG. 3 is a block diagram illustrating architecture for transfer of production control in proximity to production site for enabling decentralized manufacturing, according to an embodiment. The cloud based centralized system 302 (e.g., the cloud-based MES) includes application layer 304, information system 306, service mapper 308, and data mining and predictive analytics 310. The application layer 304 enables a production planner to plan the production sequence in a generic way. It includes user interfaces that help define various products, operations, and shop floor related master data. The master data facilitates designing of BOM and the shop-floor routing for a product variant. The application layer 304 also facilitates the production planner to create and release the production order to the plant floor 312. The service mapper 308 has three sub-units, namely, resource virtualization, virtual resource servitization, and dispatcher. The remote resource sharing and management is a challenge to cloud based centralized system 302 or MES since it is geographically separated from the plant floor 312. The virtualization and service oriented architecture are the two enabling technologies that address the above-mentioned problem. In other words, virtualization technology is the key idea behind building the cloud services in the context of manufacturing. The resource virtualization is the transformation of real/physical manufacturing resource to a virtual or logical resource. A manufacturing resource is modelled formally with a set of inputs and outputs according to its main functionality. The functional and non-functional capabilities of the resource can be semantically modelled. The model is then subjected to real-to-virtual mapping methods to map to a logical resource.

The connector 314 or GSCF can query for a set points of a specific manufacturing resource using this model at run-time in the plant floor 312. The virtual resource servitization is the transformation of concepts of capabilities provided by these manufacturing resources into formal services that are understandable by the cloud platform. This process involves several aspects such as definition of the service model, message model, ports and protocols. The service model includes the template for the service offered by cloud platform. The reception of inputs and generation of outputs of the service is defined in the message modelling process. Port modelling involves the definition of functional operation port used to accomplish the operation target. The protocol binding specifies the different protocols that are supported by the service. This service interface of virtual resource enables the connector 314 to store the resource relevant data in a realistic resource model, also called as resource digital twin. The connector 314 collects the machine data from resource periodically and pushes it to the model in the centralized system 302. This assists in real time monitoring of the manufacturing resource for the purpose of tracking the status and understanding its behaviour in interaction with other manufacturing systems, and also to calculate the equipment effectiveness. Further, the data is archived and the aggregated historical data is fed to the predictive analytics tool to find the insights into the resource behaviour.

The production order created and released by the production planner is transferred from the centralized system 302 to the plant floor 312 by the dispatcher. The logic of transferring the priority order(s) is pre-loaded into the dispatcher. The parameters that expedite the release and subsequent transfer to the plant floor 312 are production end date, priority customer, and inventory and manufacturing resource availability. The connector 314 or GSFC may be a technology and business agnostic solution. Therefore, the dispatcher should send the data, for example, a collaborative product definition and operations semantic model. The connector 314 translates this information to its compatible data model for further processing. The information system 306 stores the product genealogy including complete work instructions, components and phantom assemblies, operation flow and routing, manufacturing resources and work centres employed, bill of materials (BOM), activities on the plant floor 312, rework instructions and the discrepancies. This is realized using the Digital Object Memory (DOMe) which maintains all the information about a product instance over its production lifecycle, where each product is uniquely identified and tracked using RFID tag that contains the SFC number. Since DOMe is centrally accessible to all the involved entities of production, it enables production coordination among these entities, compilation of the historic manufacturing report, quality investigations and process improvements. The data mining and predictive analytics 310 analyses the current and past semi structured or unstructured data and extracts useful patterns and transfers this knowledge to the connector 314 or GSFC. It is then helpful to solve or mitigate the problems arising in the shop floor during production.

The connector 314 includes resource perception layer 316, production control data cache 318, decentralization facilitator 320, exception handler 322, production engine and work in progress monitor 324, and production process logger 326. The resource perception layer 316 achieves harmonization among various manufacturing resources which are to be coupled together. The internet of things (IoT) technology is employed to perceive different manufacturing resources with an intent to enable intelligent identification, detection, communication, tracking, monitoring and management. The effectiveness of this exercise hinges on the ability of this layer to extract the key information from the real/physical resources. The commonly adopted IoT techniques include RFID communication protocols for short distances and HTTP over TCP protocols for long range communication. The different manufacturing resources at the site also register themselves as virtual resources to this layer. The data is transferred to the decentralization facilitator component 320 which enables it to take decisions at run-time. The production control data cache 318 stores the data delivered by the cloud based centralized system 302 or MES. It contains the blueprint of the production execution on the shop or plant floor 312, which is the detailed routing information in the case of discrete manufacturing. The cached data constitutes production control data of part of or complete and multiple PO(s). This cached data empowers the connector 314 to take decisions with regard to production control without consulting the centralized system 302, and hence facilitating implementation of decentralization of production execution. Various entities of the connector 314 such as decentralization facilitator 320 arrive at the decisions and actions based on this retrieved production execution data. The decentralization facilitator 320 enables the decentralization in the manufacturing by coordinating with various manufacturing resources and cloud based centralized system 302. The decentralization facilitator 320 layer maintains the virtual resource pool consisting of a collection of virtual manufacturing resources. It is used in run-time classification of resources that aids on-demand resource capability matching. The virtual resource management helps the connector 314 to identify capabilities intelligently by semantic searching of suitable services and the manufacturing resources on the plant floor 312 to meet the production requirement. The connector 314 enables identification of resources dynamically at run-time for the production operations.

The exception handler 322 in the connector 314 is accountable for overcoming any shortcomings that arise in the production environment. The exception handler 322 either attempts to find alternate course of action by local coordination or seeks further instructions from the centralized system 302. Production engine and work in progress monitor 324 fetches the production order information and routing details from the production control data cache 318 and the responsibility of matching the manufacturing resources for the given operation is delegated to decentralization facilitator 320. After the decision-making process, the production engine assigns the operation job to the real/physical resources after the necessary configuration. To ensure the production is running as expected, it is necessary to monitor run-time status and respond to changes. In case of changes and exceptions, the production engine and work in progress monitor 324 coordinates with decentralization facilitator 320 and exception handler 322 to solve or mitigate the contingency. The production engine also has the intelligence to recognize the situations where the connector 314 cannot take the optimal decision based on local information. In such scenarios, the production engine and work in progress monitor 324 seeks the master data, stored in centralized system 302. The production process logger 326 uploads the variety of knowledge it gathers during the production onto the cloud based centralized system 302. This unstructured data is subjected to analysis by the data mining and predictive analytics component 310 to find patterns and transform it into a structured data. This knowledge in turn can be provided as a feedback to the connector 314 in order to optimize the production in the long run.

The components of the connector 314 may communicate with the plant floor 312. An exemplarily communication protocol between the connector 314 and the plant floor 312 may be based on open system interconnections (OSI) model, according to an embodiment. The OSI provides reliable packet transmission with bounded transmission delay. As per the open systems interconnections (OSI) model, Ethernet provides services up to and including the data link layer. On the contrary, when the communication takes place over wide area network (WAN), the transmission delay is no longer bounded. The WAN technologies generally function at the lower three layers of the OSI reference model. This includes physical, data link and network layers of OSI reference model. The loss of deterministic behaviour is the inherent property of network layer protocol of the OSI reference model. The connector 314 collects the data to and from the plant floor 312 and the centralized system 302. The connector 314 or the GSFCs also help in enabling the 'plug and work' feature, since they can connect to wide variety of industry specific data sources of diverse manufacturers. The connector 314 or GSFCs is in proximity to the machines at the plant floor 312. Due to this physical proximity, the data communication latency between the shop or plant floor 312 and the connector 314 is short as data packets need not cross multiple routers. Consequently, the connector 314 is the ideal location to store the routing and production control data from cloud based centralized system 110 or MES. The retrieval of data also facilitates the implementation of logical decentralization of the production execution. Once the production routing and production control data is retrieved and stored within the connector 314, the communication between the connector 314 and cloud based centralized system 302 is reduced as far as possible. The connector 314 takes the control of the production process execution from the centralized system 302 or MES.

In an embodiment, if exceptional situations arise in the plant floor 312 while the connector 314 is in control of the production execution, the connector 314 either resolve or find an alternative course of actions to the prevailing exceptional situations to successfully complete the production execution. In an embodiment, the collected data is investigated continuously for pattern discovery and extraction of useful information to solve or mitigate the current and future problems and optimize the operations on the plant floor 312. The intelligent data feeding from centralized system 302 to the connector 314 makes the job of the connector 314 simpler and hence it can remain a thin client to the centralized system 302. The cloud based centralized system 302 is a web based solution that runs on remote servers and is accessed via internet on standard web browsers. The centralized system 302 may be offered as IaaS (Infrastructure as a service), PaaS (Platform as a service) and SaaS (Software as a service) layers in the cloud architecture that are demand driven and charged as per usage. The services in centralized system 302 are generated by virtualizing and encapsulating the perceived manufacturing resources and capabilities.

Figure 4A:
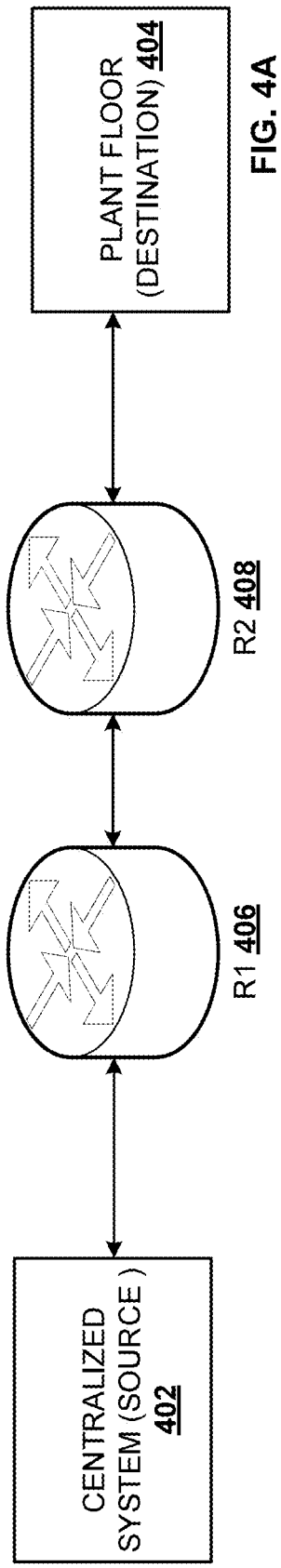
FIG. 4A illustrates network or communication delay in decentralized manufacturing, according to one embodiment.

FIG. 4A illustrates network or communication delay in decentralized manufacturing, according to an embodiment. The cloud based centralized system 402 has certain challenges such as cloud downtime and network latency. Since the centralized system 402 and plant floor 404 may be geographically distributed they have varying degrees of latency depending on the internet connections. Consequently, the number of intermittent routers between the centralized system 402 and the plant floor 404 increases. Hence location of data centres hosting the centralized system 402 plays a significant role in determining the network latency. The request and response data travel through the source and destination entities in the network via a series of routers. These data packets suffer several types of delays at each node along the network path. The throughput of the network is affected by these network delays. The data packets are sent from the source centralized system 402 to the destination plant floor 404 via routers r1 406 and r2 408. The individual router has an incoming queue and an outbound link to the other connected routers. The packet arriving at router r1 406 goes through the queue and the router r1 406 determines the outbound link after examination of the packet header. An incoming data packet is immediately bound to outbound link if the router r1 406 queue is empty and there are no packets being sent on the outbound link at the time. If the router r1 406 queue is non-empty or the corresponding outbound link is busy, the incoming packet joins the router queue r1 406. When the data packet arrives at the router r1 406, the router r1 406 examines the packet header for redirection to the appropriate destination. This causes a delay which is known as processing delay $d_{proc}$ and is the key component of network delay. The node also checks for bit level errors in the packet arising while transmitting from the previous node. After this nodal processing, the router directs the packet to a queue that precedes the outbound link. The time a packet spends in the queue while earlier packets are transmitted at the node is called queuing delay $d_{queue}$. The incoming packet experiences zero queueing delay when the router r1 406 queue is empty and no other packet is being transmitted by the router r1 406. Alternatively, the incoming packet experiences a queueing delay in direct accordance with the length of the router r1 406 queue. The router r1 406 transmits the data at a rate known as transmission rate R. When the data packets arrive for a sustained period at a given router r1 406 at a rate more than its transmission rate, these data packets will queue in at the router r1 406. The ratio of (A*B)/R, called network traffic intensity, plays an important role in determining the queueing delay, where A denotes the average number of packets that arrive at the router r1 406 queue per unit time and B is the average number of bits in each of these packets.

Figure 4B:
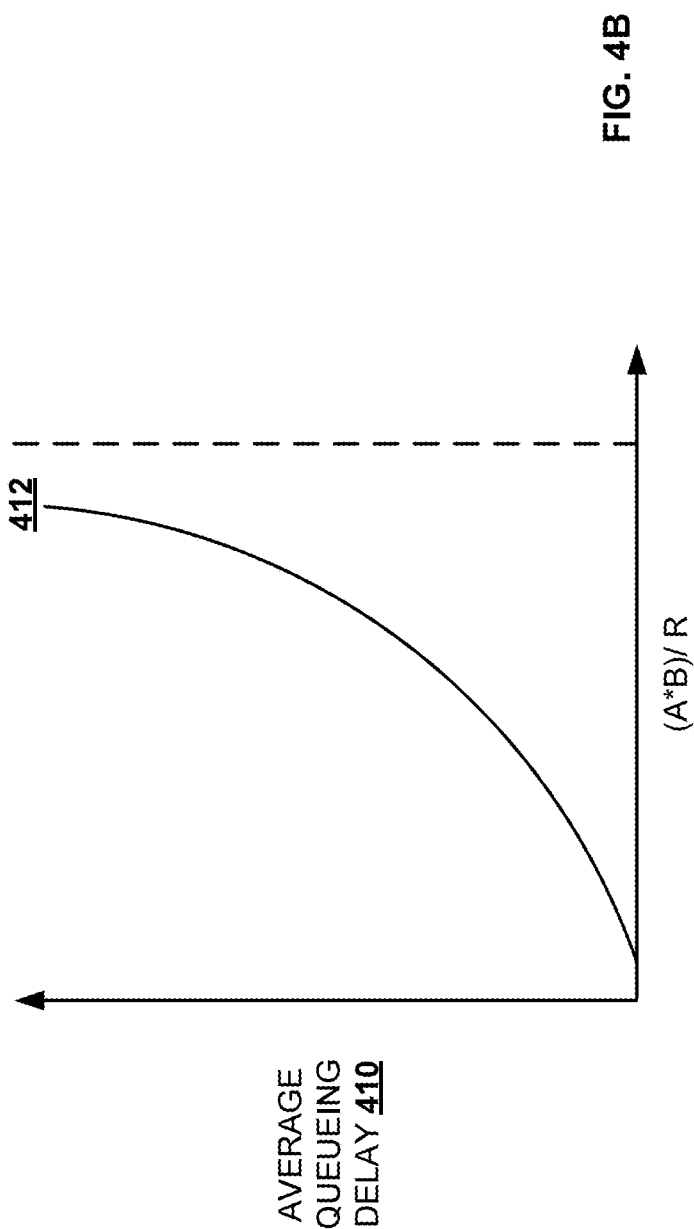
FIG. 4B illustrates average queueing delay on network traffic intensity, according to one embodiment.

FIG. 4B illustrates average queueing delay on network traffic intensity, according to an embodiment. The qualitative dependence of average queueing delay 410 on the network traffic intensity is shown in 412. As the traffic intensity tends to 1, the average queueing delay 410 grows exponentially. When the packet arrival rate is greater than router transmission rate, the size of packet queue grows at the router r1 406. However, this cannot continue indefinitely due to the finite capacity of the router r1 406 queue. Therefore, the router r1 406 drops the packet when it finds no place at its queue. Such a dropped packet is lost and this phenomenon is called packet loss. At this juncture, the client that transmitted the packet to the network core expecting the delivery acknowledgement from the server re-transmits the packet after waiting for a specified amount of time. This reduces the throughput of the network connection. The router r1 406 takes a finite time to transfer the bits of a data packet onto the outbound link. This time is known as transmission delay $d_{trans}$ and mathematically, it is defined as 'B/R'. The packet on the outbound link propagates to the next node in a time known as the propagation delay. If 'l' is the length of the physical link and 'v' is the propagation speed of the data packet in the physical link, the propagation delay $d_{prop}$ is then given by 'l/v'. The total nodal delay $d_{nodal}$ is then given by, $$d_{nodal} = d_{proc} + d_{queue} + d_{trans} + d_{prop}.$$

If there are 'N' number of similar routers between the source and destination spaced apart at equal distances, then the end to-end delay is measured as, $$d_{end\text{-}to\text{-}end} = N*(d_{proc} - d_{trans} + d_{prop}) + \Sigma(n=1, n=N) d_{queue_n}$$

where the last part of the above equation is sum of the queueing delays experienced at each of the routers r1 406 and r2 408. The network delays are directly proportional to the distance and consequently, the number of intermittent routers r1 406 and r2 408, between the centralized system 402 and the plant floor 404. In practice, with the exception of $d_{proc}$ which is on the order of microseconds, all other above-mentioned delays are on the order of milliseconds. The individual routers have unpredictable traffic which is dependent on variety of factors and hence, the network latency is a function of internet traffic that undergoes random fluctuation for the same bandwidth and infrastructure. The virtualization principle of cloud computing enables sharing and dynamic allocation of resources. The virtualization concept can be applied at different levels such as computer hardware, operating system, storage and network. This virtual network infrastructure also introduces its own series of packet delays and causes further performance degradation.

Edge computing smoothly bridges the gap between the cloud based centralized system 402 and the plant floor 404 processing. Edge computing may also be termed as fog computing, mobile edge computing, cloudlets, and cyber foraging. The edge analytics applied to the domain of manufacturing also called as decentralized manufacturing, addresses the problem of network latency and enables to take the decisions at runtime in the production and thus, can adopt to changes in the production order within short time. A decentralized work-in-progress (WIP) manufacturing control serves as an alternative to the centralized manufacturing systems. For example, the RFID-enabled MES was introduced for mass-customization in manufacturing that faced challenges of manual and paper based data collection, production plans and schedules. The edge datacentres that process the data on behalf of IoT devices and delegate to cloud when more complex analysis is required to overcome the problem of network latency and save energy for the resource constrained edge devices. By bringing the data and manufacturing control to the connector in proximity to the plant floor, less number of routers (e.g., either r1 or r2), less communication delay, and network latency, etc., may be incurred to enable efficient manufacturing.

Figure 5A:
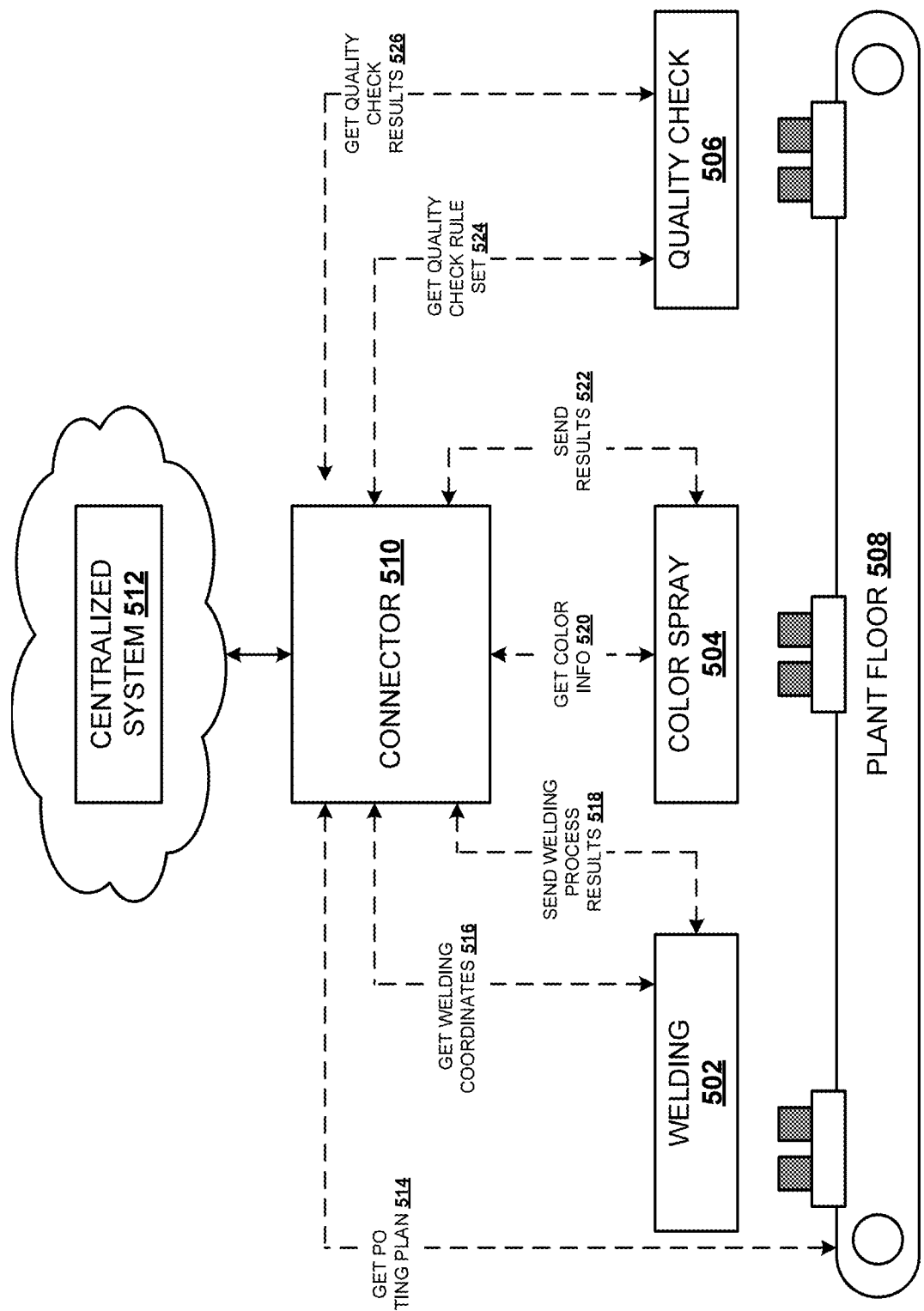
FIG. 5A illustrates an exemplary use case of operation involved in a plant floor, according to one embodiment.

FIG. 5A illustrates an exemplary use case of operation involved in a plant floor, according to one embodiment. The exemplary use case illustrates a PO where there are three operations such as welding 502, colour spray 504 and quality check 506 to be performed to produce a planned component. During the production execution, the plant floor 508 constantly seeks the information from connector 510. A periodic communication is established between the plant floor 508 and the connector 510. The plant floor 508 publishes a list of resources with capabilities associated with them to the connector 510. For example, the plant floor 508 publishes the resources with capability to perform welding, colour spraying, quality checking, etc. When the PO is received at the connector 510 with three operations such as welding 502, colour spray 504 and quality check 506 to be performed, the requirements of the operations are matched with the published resources. The allocation of a specific operation to a specific resource is dynamically performed at runtime by the connector 510. If more than one resource is available to perform the specific operation, the connector 510 dynamically determines the specific resource that is competent to perform the operation and allocates the same. The work stations at the plant floor 508 request the connector 510 for routing details at every stage of the production. The individual work station collects the operation, bill of materials (BOM), machine parameters and other resource configuration details. Once this information is collected the machine is instructed on how to proceed with that step of the production process. Once that step of the production is completed, the work station informs the connector 510 along with the generated results. The connector 510 then processes the results and accordingly sets the next operation of the production. This process continues until all the planned operations are executed to manufacture the planned component. During exceptional cases if the need arises, the routing path is changed, as instructed by the connector 510, to accommodate the exceptional situations. For example, the work in progress is diverted to rework station if the concerns regarding the quality of the products are raised. In an exceptional circumstance when the connector 510 is not able to provide the instructions, the connector 510 seeks information from the cloud based centralized system 512.

The individual information corresponding to the operations welding 502, colour spray 504 and quality check 506 are sent and received from the plant floor 508 to the connector 510. Because the connector 510 caches the required information such as the production control data from the centralized system 512, the plant floor 508 constantly communicates with the connector 510 and not the centralized system 512 thereby reducing network latency. The connector 510 caches the required production control data and routing data for the complete set of operations associated with the PO(s) at once, and one by one. For example, the plant floor 508 requests production control data such as PO and routing plan 514 from the connector 510. The connector 510 provides this information to the plant floor 508. The plant floor 508 requests welding coordinates 516 from the connector 510, and the welding operation is performed at the plant floor 508. Once the welding operation is completed, the result of the operation is sent 518 from the plant floor 508 to the connector 510 to receive instructions for the next set of operation. For the colour spray 504 operation the colour information is received 520 from the connector 510 to the plant floor 508. Once the colour spray 504 operation is performed, the result of the operation is sent 522 from the plant floor 508 to the connector 510. For the quality check 506 operation to be performed, the quality check rule set is received 524 from the connector 510 to the plant floor 508. Once the quality check 506 operation is performed, the result of the operation is sent 526 from the plant floor 508 to the connector 510. Initially information is retrieved from the centralized system 512 and cached at the connector 510, and from then the connector 510 takes control of the operations performed at the plant floor 508. To perform the operations in the plant floor 508, there is continuous coordination between the plant floor 508 and the connector 510. Finally, after the operations are performed at the plant floor 508, the result of the operations may be sent from the connector 510 to the centralized system 512.

FIG. 5B is a set of tables illustrating result of simulation with respect to network latency, according to one embodiment. For the purpose of this simulation, a cloud based centralized system such as CMES is geographically separated by approximately 1000 km from a connector and mock resource work station deployments to reproduce the typical network latency involved with the cloud solutions. The connector and resource work stations were deployed on the same Local Area Network (LAN). A production process without exceptional scenarios that corresponds to the use case illustrated in FIG. 5A was simulated with different product types of lot size '1', where production routing contained operations that were distributed to resources in a random manner. Two PO's with '5' operations and '3' operations respectively in their routing plan were created in the CMES in order to measure the network latency encountered during the production execution. The latency times measured are shown in table I 502 and table II 504. The table I 502 shows the simulation results with respect to the network latency encountered without the connector. For example, when the work stations in the plant floor are directly connected to the CMES and there is no intermediate connector. Here, in table I 502, for the '5' 506 operations, the communication between the workstation in the plant floor and the CMES results in a network latency per call as '400 ms' 508, and the number of calls between them is '10' 510 and the total network latency is '4000 ms' 512. Similarly, in table I 501, for the '3' 514 operations, the communication between the workstation in the plant floor and the CMES results in a network latency per call as '400 ms' 516, and the number of calls between them is '6' 518 and the total network latency is '2400 ms' 520.

The table II 504 shows the simulation results with respect to the network latency encountered with the connector. For example, when the work stations in the plant floor are connected to the connector and the connector is connected to the CMES. Here, in table II 504, for the '5' 522 operations, the communication between the workstation in the plant floor and the connector results in a network latency per call as '30 ms' 524, and the number of calls between them is '10' 526 and the total network latency is '300 ms' 528. Whereas, the communication between the connector and the CMES results in a network latency per call as '400 ms' 530, and the number of calls between them is '2' 532 and the total network latency is '800 ms' 534. In total the network latency suffered by the PO is '1100 ms' 536. The total network latency for the PO with '5' 522 operations has significantly reduced from '4000 ms' 512 to '1100 ms' 536. Similarly, in table II 504, for the '3' 538 operations, the communication between the workstation in the plant floor and the connector results in a network latency per call as '30 ms' 540, and the number of calls between them is '6' 542 and the total network latency is '180 ms' 544. Whereas, the communication between the connector and the CMES results in a network latency per call as '400 ms' 546, and the number of calls between them is '2' 548 and the total network latency is '800 ms' 550. In total the network latency suffered by the PO is '980 ms' 552. The total network latency for the PO with '3' 538 operations has significantly reduced from '2400 ms' 520 to '980 ms' 552. With the connector, the total latency shows a marked decrease in simulation.

Figure 6:
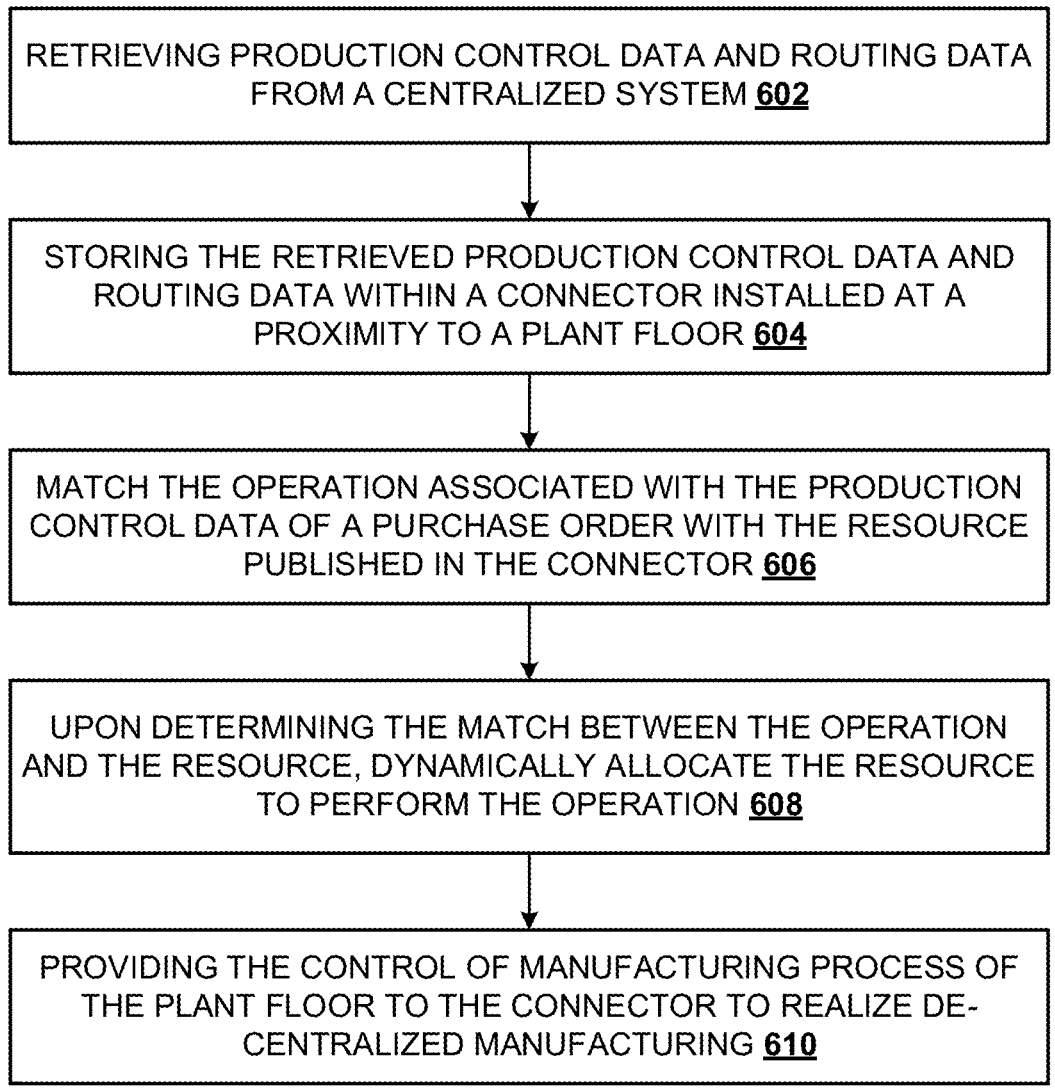
FIG. 6 is flow chart illustrating a process of transfer of production control in proximity to production site for enabling decentralized manufacturing, according to one embodiment.

FIG. 6 is flow chart illustrating a process of transfer of production control in proximity to production site for enabling decentralized manufacturing, according to one embodiment. At 602, production control data and routing data are retrieved from a centralized system. At 604, the retrieved production control data and the routing data are stored within a connector installed at a proximity to a plant floor. At 606, an operation associated with the production control data of a purchase order is matched with the resource published in the connector. At 608, upon determining the match between the operation and the resource, the resource is dynamically allocated to perform the operation. At 610, the control of manufacturing process of the plant floor is provided to the connector to realize de-centralized manufacturing.

The generic set of functionalities is built dynamically based on the customers' requirements and typically, the functionalities provided by centralized system are richer than on premise counterparts and are also simple, fast and cheap. The other benefit of the centralized system is that it requires nearly no IT resource investment. This lowers the entry costs for smaller firms that try to benefit from compute-intensive business analytics that were previously available only to the large corporations. This also lowers the IT barriers to innovation in the manufacturing processes. The centralized system helps smoothly face the uninformed challenge of peak production demand without additional investment on the on-premise resources.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
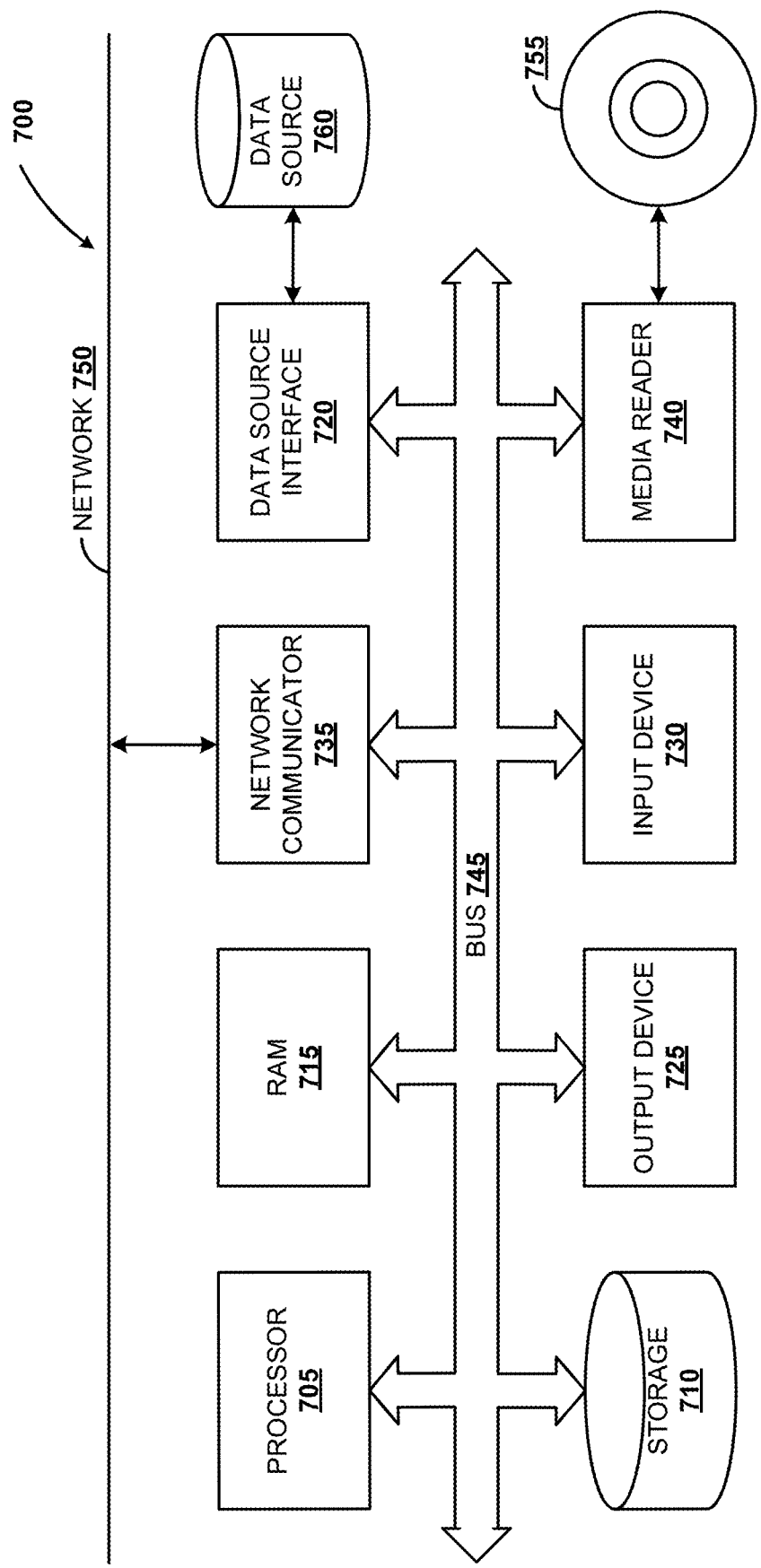
FIG. 7 is a block diagram of an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:

retrieve production control data and routing data from a centralized system, wherein the production control data comprises production orders defining materials to be processed at a plant floor, and wherein the routing data comprises routing details for the production orders at the plant floor;

store the retrieved production control data and the routing data within a connector installed at the plant floor;

process, by the connector, a production order from the production control data to be released at the plant floor, wherein processing the production order comprises:

publish, by the connector, manufacturing resources available at the plant floor as virtual resources in a virtual resource pool, wherein the virtual resources are linked to real physical resources at the plant floor, wherein the virtual resources define functional and non-functional capabilities of the linked real physical resources at the plant floor;

match requirements of operations part of the production order with the published manufacturing resources as the virtual resources, dynamically allocate an operation from the operations to a specific resource from the published manufacturing resources as the virtual resources, wherein the allocation is executed at runtime by the connector to provide de-centralized manufacturing at the plant floor;

provide routing details for the operation to a work station at the plant floor for processing the production order; and cache result data by the connector, wherein the result data is received from the floor plan for completing the production order including data for the operations part of the production order.

2. The computer-readable medium of claim 1, further comprises instructions which when executed by the computer further cause the computer to:
store the production control data and the routing data of a purchase order completely within the connector, wherein the production control data comprises at least one of production order and product variant to be produced.

3. The computer-readable medium of claim 1, wherein the centralized system is a cloud-based manufacturing execution system (MES).

4. The computer-readable medium of claim 1, wherein the instructions to dynamically allocate the operation to the specific resource further comprise instructions which when executed by the computer further cause the computer to:
establish periodic communication between the plant floor and the connector;
update a result of the operation in the connector from the plant floor; and
process the result and send a next operation to the plant floor.

5. The computer-readable medium of claim 1, wherein the connector is a thin client to the centralized system.

6. A computer-implemented method for enabling decentralized manufacturing, the method comprising:
retrieving production control data and routing data from a centralized system, wherein the production control data comprises production orders defining materials to be processed at a plant floor, and wherein the routing data comprises routing details for the production orders at the plant floor;
storing the retrieved production control data and the routing data within a connector installed at the plant floor;
processing, by the connector, a production order from the production control data to be released at the plant floor, wherein processing the production order comprises:
publishing, by the connector, manufacturing resources available at the plant floor as virtual resources in a virtual resource pool, wherein the virtual resources are linked to real physical resources at the plant floor, wherein the virtual resources define functional and non-functional capabilities of the linked real physical resources at the plant floor;
matching requirements of operations part of the production order with the published manufacturing resources as the virtual resources,
dynamically allocating an operation from the operations to a specific resource from the published manufacturing resources as the virtual resources, wherein the allocation is executed at runtime by the connector to provide de-centralized manufacturing at the plant floor;
providing routing details for the operation to a work station at the plant floor as an instruction step for processing the production order; and
caching result data by the connector, wherein the result data is received from the floor plan for completing the production order including data for the operations part of the production order.

7. The method of claim 6, further comprising:
storing the production control data and the routing data of a purchase order completely within the connector, wherein the production control data comprises at least one of production order and product variant to be produced.

8. The method of claim 6, wherein the centralized system is a cloud-based manufacturing execution system (MES).

9. The method of claim 6, wherein dynamically allocating the operation to the specific resource further comprises:
establishing periodic communication between the plant floor and the connector;
updating a result of the operation in the connector from the plant floor; and
processing the result and send a next operation to the plant floor.

10. The method of claim 6, wherein the connector is a thin client to the centralized system.

11. A computer system for for enabling decentralized manufacturing, comprising:
a computer memory to store program code; and
a processor to execute the program code to:
retrieve production control data and routing data from a centralized system, wherein the production control data comprises production orders defining materials to be processed at a plant floor, and wherein the routing data comprises routing details for the production orders at the plant floor;
store the retrieved production control data and the routing data within a connector installed at the plant floor;
process, by the connector, a production order from the production control data to be released at the plant floor, wherein processing the production order comprises:
publish, by the connector, manufacturing resources available at the plant floor as virtual resources in a virtual resource pool, wherein the virtual resources are linked to real physical resources at the plant floor, wherein the virtual resources define functional and non-functional capabilities of the linked real physical resources at the plant floor;
match requirements of operations part of the production order with the published manufacturing resources as the virtual resources,
dynamically allocate an operation from the operations to a specific resource from the published manufacturing resources as the virtual resources, wherein the allocation is executed at runtime by the connector to provide de-centralized manufacturing at the plant floor;
provide routing details for the operation to a work station at the plant floor as an instruction step for processing the production order; and
cache result data by the connector, wherein the result data is received from the floor plan for completing the production order including data for the operations part of the production order.

12. The system of claim 11, wherein the processor further executes the program code to:
store the production control data and the routing data of a purchase order completely within the connector, wherein the production control data comprises at least one of production order and product variant to be produced.

13. The system of claim 11, wherein the centralized system is a cloud-based manufacturing execution system (MES).

14. The system of claim 11, wherein dynamically allocating the operation to the specific resource cause the processor further executes the program code to:

establish periodic communication between the plant floor and the connector;
update a result of the operation in the connector from the plant floor; and
process the result and send a next operation to the plant floor.

* * * * *